(No Model.)
W. H. H. CLOPPERT.
STONE HOISTER.
No. 300,217. Patented June 10, 1884.
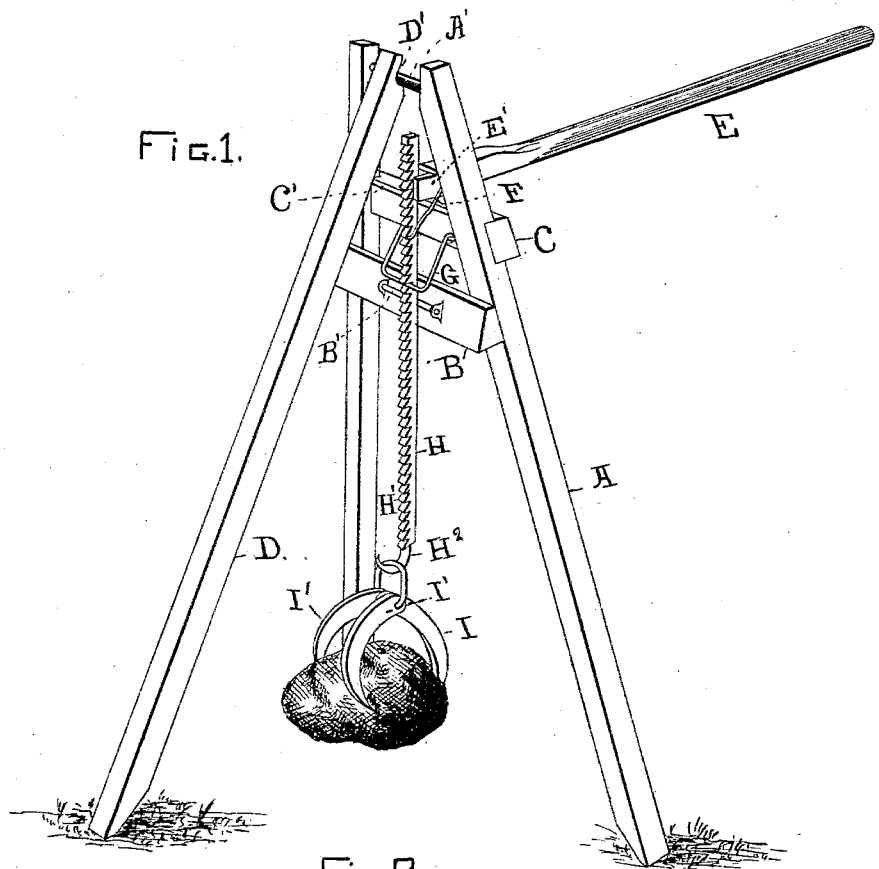
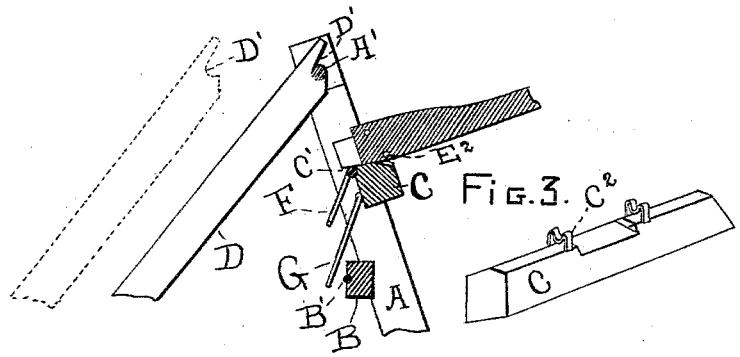
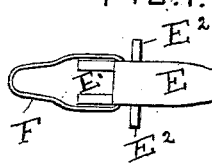
WITNESSES:
U. A. Clark.
P. B. Turpin
INVENTOR.
William H. H. Cloppert
By R. S. & A. P. Lacey
Attorney

UNITED STATES PATENT OFFICE.

WILLIAM H. H. CLOPPERT, OF TROTWOOD, OHIO, ASSIGNOR OF TWO-THIRDS TO MOSES WOGAMAN AND GEORGE W. GAINES.

STONE-HOISTER.

SPECIFICATION forming part of Letters Patent No. 300,217, dated June 10, 1884.

Application filed February 7, 1884. (No model.)

*To all whom it may concern:*

Be it known that I, WILLIAM H. H. CLOPPERT, a citizen of the United States, residing at Trotwood, in the county of Montgomery and State of Ohio, have invented certain new and useful Improvements in Stone-Hoisters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for elevating rocks, pulling stumps, &c.; and it consists in the novel construction, combination, and arrangement of the several parts, as will be hereinafter more fully described and claimed.

In the drawings, Figure 1 is a perspective view of my machine. Fig. 2 is a detached vertical section of the upper part of same. Fig. 3 is a detail perspective view of the bearing cross-bar. Fig. 4 is a detail plan view of a portion of the operating-lever, all of which will be described.

The main frame is composed of the standards A A, having their upper ends inclined toward each other, or convergent, as shown, and the cross-bars B C. A head-rod, A', connects the upper end of the standards A. The brace or strut D has its upper end slotted at D' to fit on such rod, and when applied thereto, as shown, forms, in connection with the main frame, a firm, strong tripod to support the operating devices, presently described. The bars B C are arranged, respectively, on what for convenience of reference I call the "front" and "rear" sides of the main frame, and one below the other, as shown. In operation the main frame is arranged at such an angle that the forward edges of each of these cross-bars are in approximately the same vertical plane. Rollers B' C' are journaled on the forward edges of these cross-bars, for the purposes presently described. The operating-lever E has its forward end slotted at E', to permit the passage of the hoisting rack-bar, and it is provided near its lower edge with lateral trunnions $E^2$, which are journaled in suitable bearings, $C^2$, secured on the bar C. A bail, F, is secured to the lever at a point slightly in advance of its pivot, and depends therefrom, as shown. Another bail, G, is supported on and depends from the bar B. I denominate the bail F the "hoisting-bail" and the bail G the "pawl-bail," said terms being descriptive of their functions, as will appear hereinafter. The rack-bar H is formed on its forward edge with ratchet-teeth H', and is provided at its lower end with means, preferably a hook, $H^2$, for connecting the grappling devices.

The grappling device consists of arms I I' I', preferably three in number. These arms are bent, as shown, and have their lower ends curved inward and pointed, as shown, and their upper ends are secured on a common pivot, which pivot is connected with the elevating rack-bar. The arms I', it will be seen, operate on the opposite side of the object to be lifted from the arm I. It will also be seen the points of arms I' rest on opposite sides of the point of arm I, and in use prevent the swinging of the stone or other object on the grappling-points. It will be seen that when these arms are placed under a rock or similar object in the manner shown they will grapple same firmly, dispensing with the use of fastening-chains, &c., as will obviously appear.

In operation the ratchet-bar is passed up through the pawl and hoisting bails, with its rear side resting against the anti-friction rolls B' C'. This bar also passes the slot in the end of the lever, and is guided thereby, as will be appreciated. As the power end of the lever is depressed, its bail, engaging the ratchets on the bar, will raise said bar, and when the lever is depressed to get a new hold the pawl-bail engages and holds the bar in the position to which it has been raised. The anti-friction rollers prevent the binding or friction of the bar against the cross-bars B C, and render the operation of the machine easier, as will be readily understood.

When not in use, the standard, strut, rack-bar, and lever may be detached and stored in a small space out of the way.

The machine is simple, may be economically constructed, and is strongly and easily operated for the desired purpose.

Having thus described my invention, what

I claim, and desire to secure by Letters Patent, is—

1. The combination of the bar having a series of ratchet-teeth on one side, the frame provided with anti-friction rollers and a suitable pawl-bail, and the lever provided with an elevating-bail, substantially as and for the purposes set forth.

2. The combination, with the ratchet-bar and the framing provided with a pawl-bail and anti-friction rolls arranged to receive the bearing of said ratchet-bar, of the lever provided with a hoisting-bail, said lever having its end slotted or bifurcated and embracing and guiding the ratchet-bar, substantially as and for the purposes specified.

3. In a stone-hoister, a grapple, substantially as herein described, having arms I I' I', the points of arms I' being arranged on opposite sides of the point of arm I, as and for the purposes specified.

4. The combination of the main frame having a head-rod and upper and lower cross-bars provided with anti-friction rollers arranged to receive the bearing of the ratchet-bar, the pawl-bail suspended from the lower cross-bar, the lever pivoted on the upper cross-bar and provided with a hoisting-bail, the ratchet-bar, and the strut or brace having its upper edge slotted and engaging the head-rod of the main frame, substantially as and for the purposes set forth.

In testimony whereof I affix my signature in presence of two witnesses.

WILLIAM H. H. CLOPPERT.

Witnesses:
 A. G. HALLER,
 DAN H. PFOUTZ.